United States Patent [19]

Takenaka et al.

[11] Patent Number: 5,239,868
[45] Date of Patent: * Aug. 31, 1993

[54] ANGULAR RATE DETECTING DEVICE

[75] Inventors: Hiroshi Takenaka, Ikoma; Mikio Nozu, Yamatokouriyama; Hiroshi Senda, Osaka; Toshihiko Ichinose, Osaka; Jiro Terada, Osaka; Kazumitsu Ueda, Osaka; Yasuhito Osada, Kyoto; Takahiro Manabe, Osaka, all of Japan

[73] Assignee: Matsushita Electric Industrial Co., Ltd., Kadoma, Japan

[*] Notice: The portion of the term of this patent subsequent to Aug. 13, 2008 has been disclaimed.

[21] Appl. No.: 933,586

[22] Filed: Aug. 24, 1992

Related U.S. Application Data

[60] Continuation of Ser. No. 714,569, Jun. 13, 1991, abandoned, which is a division of Ser. No. 526,027, May 21, 1990, Pat. No. 5,038,613.

[30] Foreign Application Priority Data

May 19, 1989 [JP] Japan ................................. 1-126970

[51] Int. Cl.⁵ .............................................. G01P 9/04
[52] U.S. Cl. ...................................................... 73/505
[58] Field of Search .................. 73/493, 505, 510, 431

[56] References Cited

U.S. PATENT DOCUMENTS

| | | | |
|---|---|---|---|
| 4,347,743 | 9/1982 | Rausche et al. | 73/493 |
| 4,628,734 | 12/1986 | Watson | 73/505 |
| 4,791,815 | 12/1988 | Yamaguchi et al. | 73/505 |
| 4,896,268 | 1/1990 | MacGugan | 73/505 |

Primary Examiner—John E. Chapman
Attorney, Agent, or Firm—Cushman, Darby & Cushman

[57] ABSTRACT

An angular rate sensor detects an angular rate which is produced when a mobile body such as a motor vehicle moves. The angular rate detecting device comprises at least two angular rate sensors housed in a case perpendicularly to each other. The angular rate sensor comprising a pair of vibratory units which are interconnected by a connector in a tuning-fork configuration. The vibratory units of the angular rate sensors are vibrated at different frequencies. The angular rate sensors may be accommodated in a damper block, which may be housed in the case. Since the angular rate sensors are housed in the single case, the angular rate detecting device is compact in structure and small in size. With the angular rate sensors accommodated in the damper block, they are protected from resonance, crosstalk interferences, and noise, and hence can produce reliable detected output signals.

2 Claims, 10 Drawing Sheets

Fig. 12a.
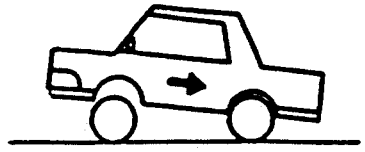 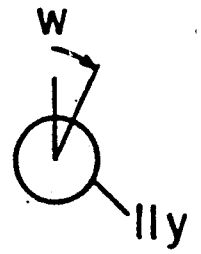
Fig. 12b.
 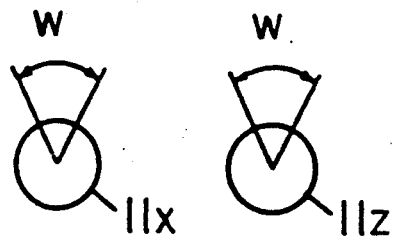
Fig. 12c.
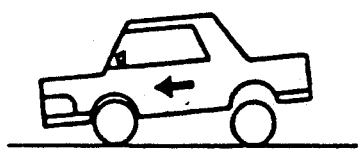 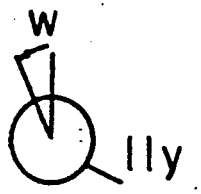

ANGULAR RATE DETECTING DEVICE

This is a continuation of application Ser. No. 07/714,569, filed on Jun. 13, 1991, now abandoned, which is a division of application Ser. No. 07/526,027, filed on May 21, 1990, now U.S. Pat. No. 5,038,613.

BACKGROUND OF THE INVENTION

1. Field of the Invention

The present invention relates to an angular rate detecting device for detecting an angular rate which is produced when a mobile body such as a motor vehicle moves.

2. Description of the Prior Art

LSI circuits and microcomputers which can execute very complex arithmetic operations have been developed in recent years as a result of modern semiconductor developments. Control devices using such LSI circuits and microcomputers have also been developed to perform various sophisticated control functions. These control devices have been improved and are now so reliable that they can operate properly in severe adverse environments such as on motor vehicles.

One of recent major efforts directed to the motor vehicle technology is the development of a suspension control system which improves the riding comfort and stable maneuverability of a motor vehicle. According to a conventional suspension control system, various disturbances, such as a roll and a pitch, which act on a motor vehicle while it is being driven are detected by sensors installed on the motor vehicle, and the spring constants, damping forces, and damping strokes of the suspensions on the motor vehicle are varied depending on the detected disturbances, thereby maintaining desired levels of riding comfort and maneuvering stability of the motor vehicle.

One conventional suspension control system will be described below with reference to FIG. 1 of the accompanying drawings. The suspension control system includes an electronic controller 1 which is supplied with detected information from a number of sensors mounted on a motor vehicle. Based on the supplied information, the electronic controller 1 operates actuators disposed in respective shock absorbers 2 of suspensions associated with respective road wheels, for varying damping forces produced by the shock absorbers 2. For example, the suspension control system performs anti-squat, anti-dive, anti-roll, and anti-bounce functions. More specifically, the anti-squat function prevents the rear end of the motor vehicle from being lowered during hard acceleration based on detected information from a throttle position sensor 3 and vehicle speed sensor 4. The anti-dive function is effective to resist the nosing-down of the front end of the motor vehicle during braking or engine braking based on detected information from a brake switch 5 and the vehicle speed sensor 4. The anti-roll function resists rolling of the motor vehicle, caused by a steering action, based on detected information from a steering sensor 6 and the vehicle speed sensor 4. The anti-bounce function responds to detected information from a road condition sensor 7 and the vehicle speed sensor 4 to prevent the motor vehicle from pitching in rough road conditions.

Another suspension control system includes, in addition to the sensors described above, an acceleration sensor, a clutch sensor, a parking brake switch, and a door switch to produce other information to be supplied to the electronic controller.

Generally, a suspension with variable damping forces is controlled for a softer damping setting if more riding comfort is desired, and for a harder damping setting if more maneuvering stability is desired. According to the conventional suspension control systems, if a control mode is selected for more maneuvering stability than riding comfort, many phenomena such as a change in the vehicle speed, a change in the steering angle, and a change in the road condition, which are responsible for disturbances such as a roll and a pitch, are detected, and the suspensions are controlled to vary their damping forces in anticipation of impending rolling and pitching motions of the motor vehicle. Therefore, many sensors are required to detect those phenomena. Since the suspension control systems effect predictive control for the operation of the suspensions, necessary arithmetic operations are complex, and the suspensions may sometimes be controlled erroneously to produce damping forces which do not match actual motions of the motor vehicle.

Japanese Laid-Open Patent Publication No. 63(1988)-68413, for example, proposes a suspension control system for controlling the operation of motor vehicle suspensions based on vehicle motion information which is directly detected by a reduced number of sensors.

SUMMARY OF THE INVENTION

It is an object of the present invention is to provide an angular rate detecting device having a reduced number of sensors for detecting desired information, which may be utilized to control another device such as a suspension or to detect an orientation of a mobile body.

According to the present invention, an angular rate detecting device comprises at least two angular rate sensors housed in a case perpendicularly to each other. Each of the angular rate sensors comprises a first vibratory unit including a first piezoelectric drive element and a first piezoelectric detection element which are joined to each other in orthogonal planes, respectively, and a second vibratory unit including a second piezoelectric drive element and a second piezoelectric detection element which are joined to each other in orthogonal planes, respectively, the first and second vibratory units extending parallel to a detection axis. Ends of the first and second piezoelectric drive elements are interconnected in a tuning-fork structure. The first vibratory units of the angular rate sensors being vibratable at different frequencies. The angular rate sensors may be accommodated in a damper block, which may be housed in the case.

Output signals from the mutually perpendicular angular rate sensors may be used to detect a displacement of a motor vehicle, for example, and may be processed by an electronic controller to control the suspensions of the motor vehicle for improving riding comfort and maneuvering stability. Since the angular rate sensors are housed in the single case, the angular rate detecting device is compact in structure and small in size. With the angular rate sensors accommodated in the damper block, they are protected from resonance, crosstalk interferences, and noise, and hence can produce reliable detected output signals.

The angular rate detecting device according to the present invention can be used not only for the control of motor vehicle suspensions, but also for the detection of swinging movement of a device and the control of the attitude of the device. Alternatively, the angular rate detecting device may be used to detect a change in the direction in which a mobile body moves as an angular rate change, thereby detecting a change in the orientation of the mobile body.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 12(a), 12(b), and 12(c) are diagrams showing the relationship between vehicle motions or disturbances and angular rates detected by sensors.

DETAILED DESCRIPTION

An angular rate detecting device according to the present invention has a plurality of tuning-fork vibratory-gyro angular rate sensors which are structurally identical to each other. One of the tuning-fork vibratory-gyro angular rate sensors will be described below with reference to FIGS. 2 through 6.

Figure 1:
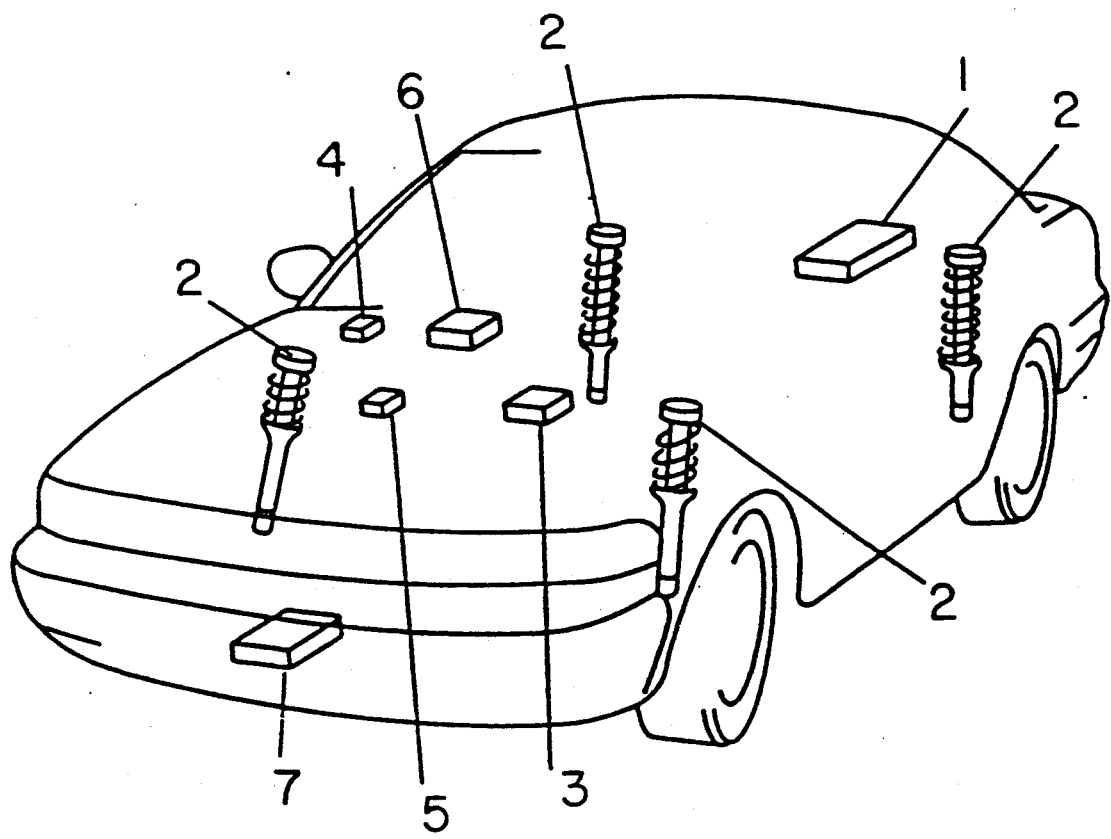
FIG. 1 is a schematic perspective view of a conventional suspension control system.
Figure 2:
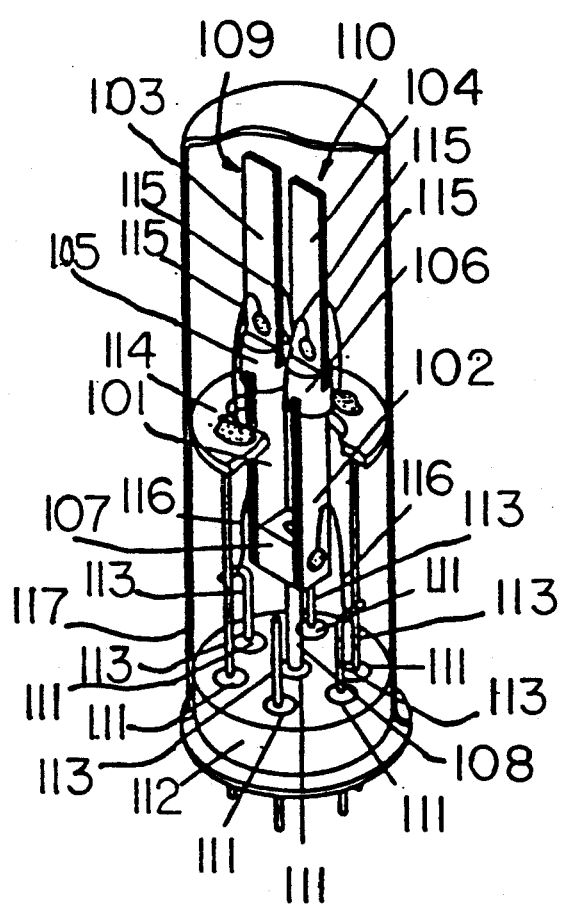
FIG. 2 is a perspective view, partly cut away, of an angular rate sensor in an angular rate detecting device according to the present invention.
Figure 3:
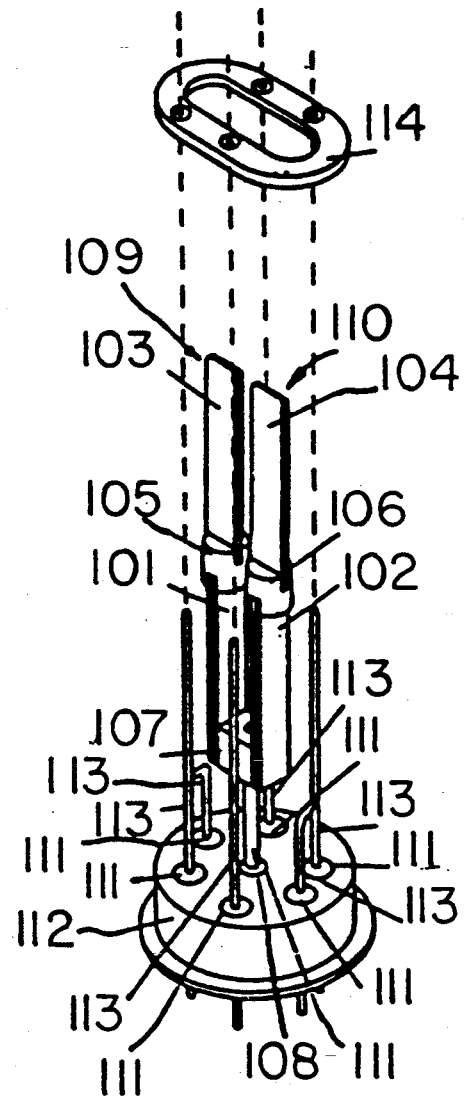
FIG. 3 is an exploded perspective view of the angular rate sensor shown in FIG. 2, with a case being omitted from illustration.

FIGS. 2 and 3 show the structure of the tuning-fork vibratory-gyro angular rate sensor. As shown in FIGS. 2 and 3, the angular rate sensor comprises first and second vibratory units 109, 110 spaced from each other and extending parallel to a detection axis (vertical in FIGS. 2 and 3). The first vibratory unit 109 comprises a piezoelectric bimorph drive element 101 and a first piezoelectric bimorph detection element 103 which are linearly joined, end to end, to each other by an insulating joint 105 and lie in orthogonal planes, respectively. The second vibratory unit 110 comprises a piezoelectric bimorph monitor drive element 102 and a second piezoelectric bimorph detection element 104 which are linearly joined, end to end, to each other by an insulating joint 106 and lie in orthogonal planes, respectively. The drive elements 101, 102 have lower ends coupled to each other by a connector 107 such that they assume the shape of a tuning fork, with the connector 107 being supported on a support rod 108. The support rod 108 is attached to a support base 112 through an insulating member 111 of glass. The first and second vibratory units 109, 10, the connector 107, and the support rod 108 jointly constitute a sensor unit (see also FIG. 4) mounted on the support base 112.

A plurality of (six in the illustrated embodiment) lead terminals 113 are also attached to the support base 112 by insulating members 111 of glass, the lead terminals 113 being electrically connected to respective electrodes of the drive elements 101, 102 and the first and second detection elements 103, 104. Some (four in the illustrated embodiment) of the lead terminals 113 extend near the joints 105, 106 and are connected at their distal ends to an annular shaped relay board 114 extending around the drive elements 101, 102. Lead wires 115 have ends connected to the electrodes of the first and second detection elements 103, 104 and the other ends connected to those lead terminals 113 through the relay board 114. Lead wires 116 have ends connected to the electrodes of the drive elements 101, 102 and the other ends connected directly to the other lead terminals 113.

The sensor unit is housed in a bottomed cylindrical metallic case 117 (FIG. 2) with its open end closed by the support base 112 fitted therein.

When a sine-wave-voltage signal is applied to the drive element 101, the first vibratory unit 109 starts vibrating according to the reverse piezoelectric effect, and the second vibratory unit 110 also starts vibrating due to tuning-fork vibration. Electric charges generated on the surface of the monitor drive element 102 according to the piezoelectric effect are proportional to the sine-wave-voltage signal applied to the drive element 101. The electric charges generated on the monitor drive element 102 are detected, and the sine-wave-voltage signal applied to the drive element 101 is controlled so that the detected electric charges are of a constant amplitude. In this manner, the tuning-fork vibration of the sensor unit is stabilized.

Figure 4:
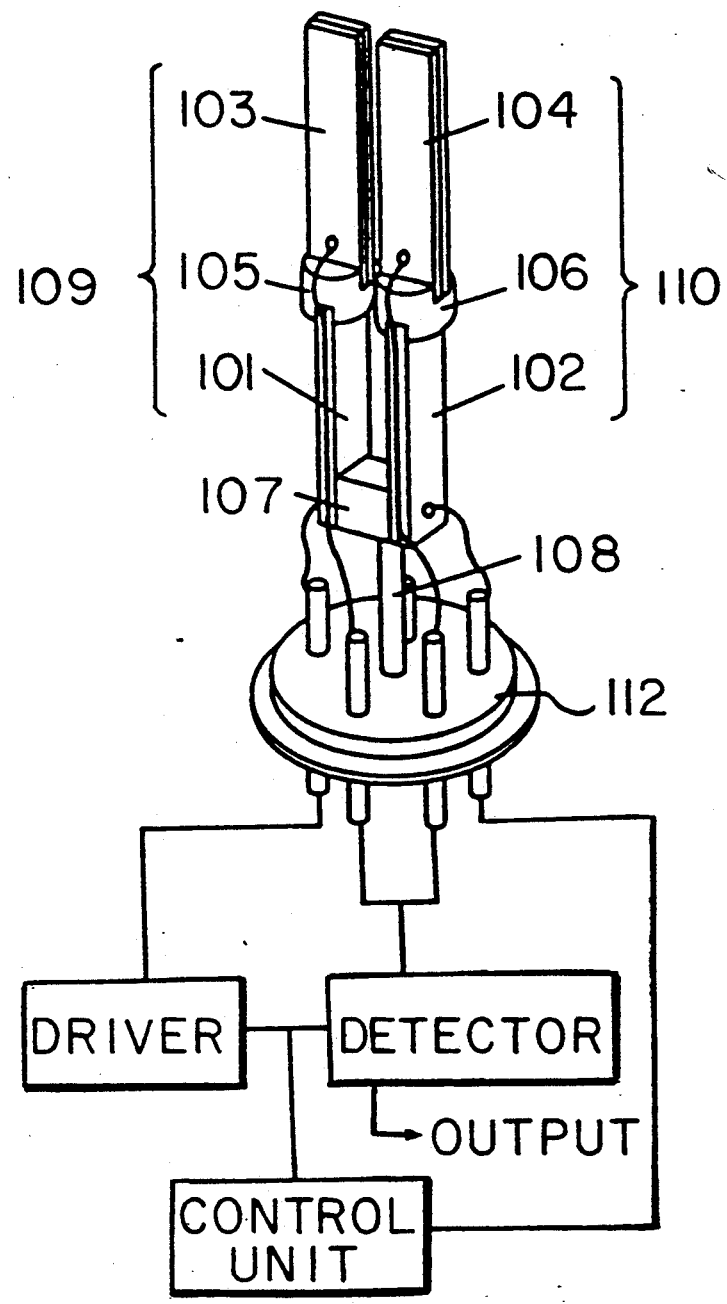
FIG. 4 is a perspective view of a sensor unit of the angular rate sensor shown in FIGS. 2 and 3.
Figure 5:
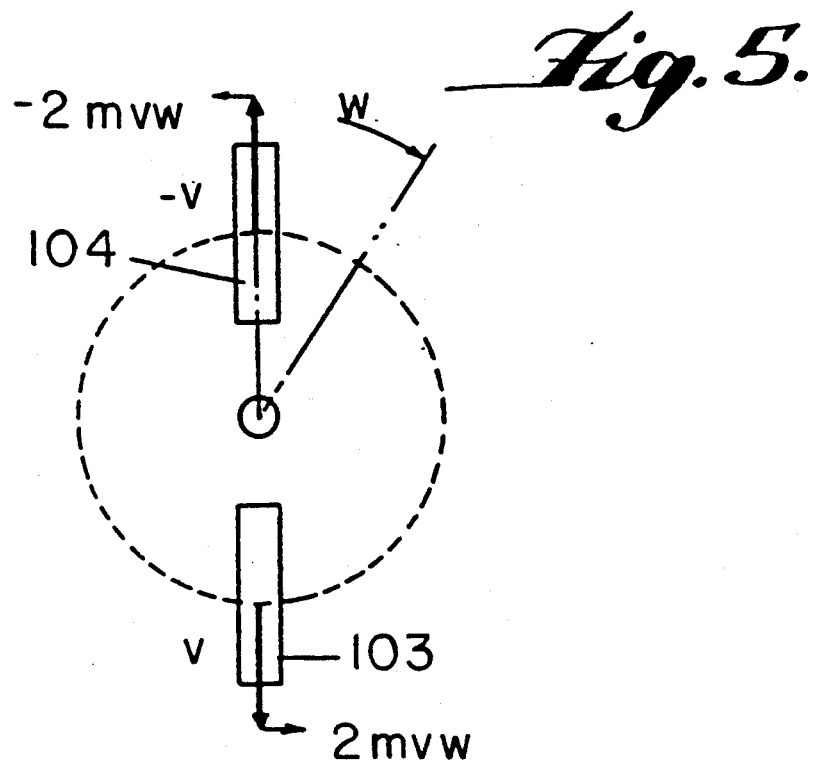
FIGS. 5 and 6 are schematic views illustrative of the principles of operation of the angular rate sensor.
Figure 6:
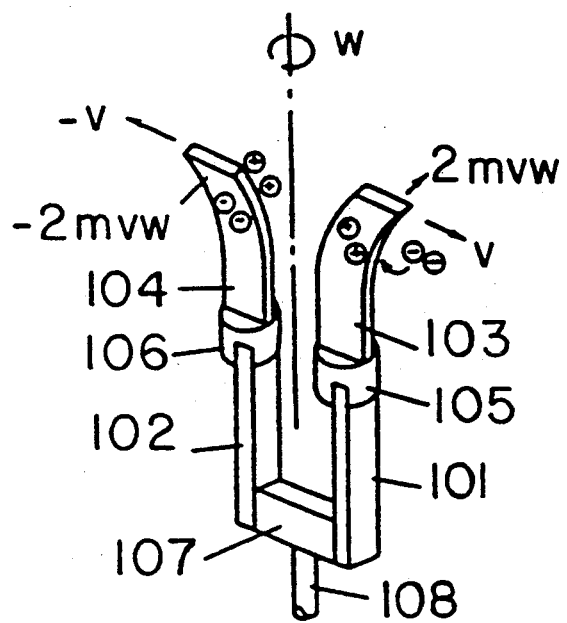

The mechanism for the sensor unit to produce an output proportional to an angular rate thereof will be described below with reference to FIGS. 4 through 6. FIG. 4 shows only the sensor unit of the angular rate sensor. FIG. 5 shows the sensor unit of FIG. 4 as viewed from above. When the rotation having an angular velocity $\omega$ is imparted to the detection element 103 which is vibrating at a velocity $v$, a Coriolis force is developed on the detection element 103. The Coriolis force is directed perpendicularly to the direction of the velocity $v$, and has a magnitude of $2\,mv\omega$. Since the detection element 103 is being subjected to the tuning-fork vibration, if the detection element 103 vibrates at the velocity $v$ at a certain time, then the detection element 104 vibrates at a velocity $-v$ at that time, and the Coriolis force acting on the detection element 104 is indicated by $-2\,mv\omega$. Therefore, as shown in FIG. 6, the detection elements 103, 104 are elastically deformed in the directions in which their Coriolis forces are exerted, with the result that electric charges are produced on these detection elements 103, 104 according to the piezoelectric effect. The velocity $v$ is caused by a motion produced by the tuning-fork vibration. If it is assumed that the tuning-fork vibration is expressed by:

$$v = a \cdot \sin \omega_0 t$$

where
  $a$: the amplitude of the tuning-fork vibration; and

ω0: the period of the tuning-fork vibration, then, the Coriolis force is represented by:

$$Fc = a \cdot \omega \cdot \sin \omega_0 t.$$

Therefore, the Coriolis force is proportional to the angular velocity ω and the amplitude a of the tuning-fork vibration, and is applied in the directions to elastically deform the detection elements 103, 104 along their planes. Therefore, surface electric charges Q produced on the detection elements 103, 104 are indicated by:

$$Q = a \cdot \omega \cdot \sin \omega_0 t.$$

If the tuning-fork vibration is controlled so that its amplitude a is constant, then the electric charges Q are indicated by $$Q = \omega \cdot \sin \omega_0 t.$$

The surface electric charges generated on the detection elements 103, 104 are thus obtained as an output signal proportional to the angular velocity ω. When this output signal is detected in synchronism with ω0t, a DC signal proportional to the angular velocity ω is generated.

When a translational motion is applied to the sensor unit, electric charges of the same polarity are produced on the surfaces of the detection elements 103, 104. Since these electric charges cancel out each other when they are converted into a DC signal, no output signal is generated by the sensor unit.

The angular rate detecting device according to the present invention has at least two angular rate sensors, as shown in FIGS. 2 through 6, for detecting displacements of an object. If displacements of the object in the directions about X- and Y-axes are to be detected, then two angular rate sensors are employed, and if displacements of the objects in the directions about X-, Y-, and Z-axes are to be detected, then three angular rate sensors are employed.

Figure 7:
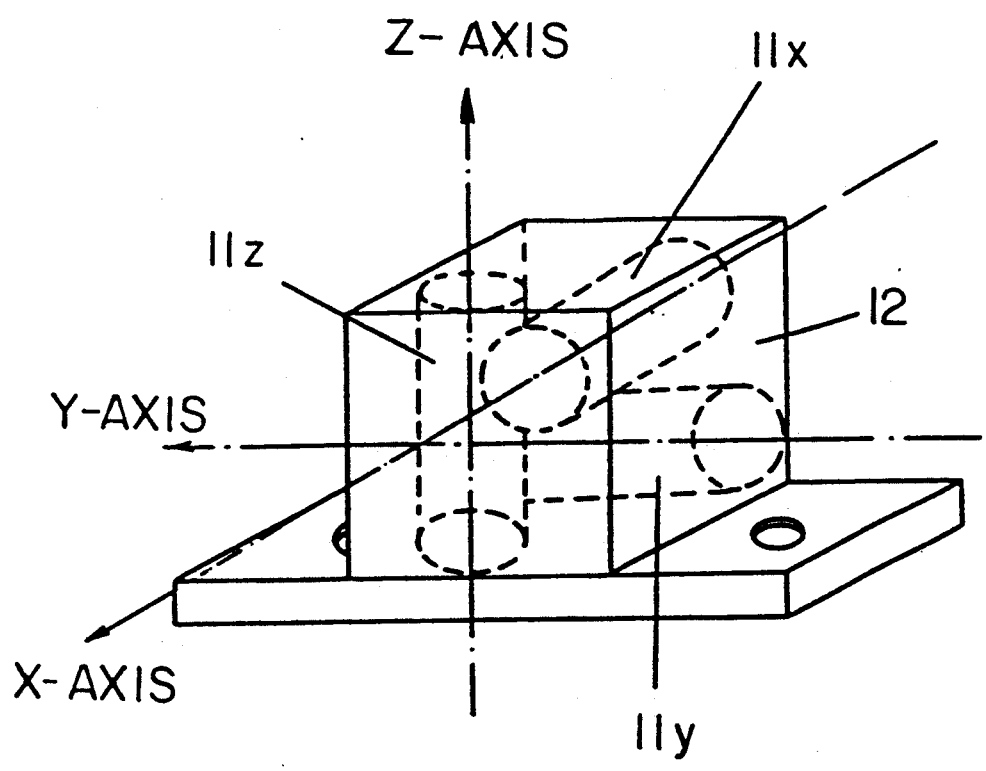
FIG. 7 is a perspective view of one form of the angular rate detecting device according to the present invention.

FIG. 7 shows one form of the angular rate detecting device according to the present invention. The angular rate detecting device shown in FIG. 7 has three angular rate sensors 11x, 11y, 11z, each constructed as shown in FIGS. 2 and 3, which have their longitudinal axes lying perpendicular to each other. The angular rate sensors 11x, 11y, 11z are housed in a single case 12 of aluminum. The angular rate sensors 11x, 11y, 11z have respective first vibratory units (corresponding to the vibratory unit 109 shown in FIGS. 2 and 3) which are vibratable at different frequencies, respectively.

Figure 8:
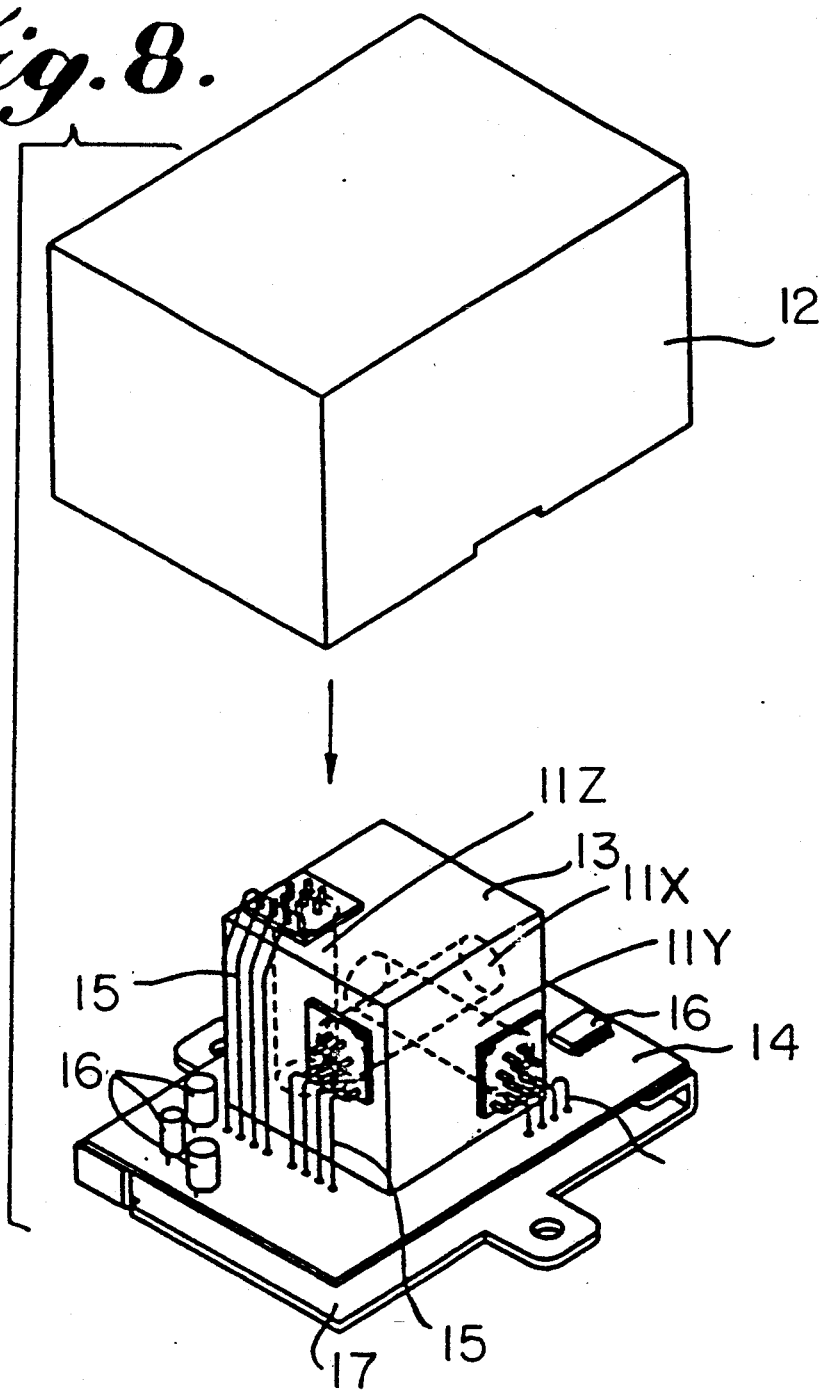
FIG. 8 is an exploded perspective view of the angular rate detecting device, showing an internal structure

FIG. 8 shows an internal structure of the angular rate detecting device, with the case 12 removed. As shown in FIG. 8, the angular rate sensors 11x, 11y, 11z are force-fitted in a damper block 13 that is made of a vibration/shock absorbing material such as polyurethane, silicone, or the like. The damper block 13 is fixedly mounted on a circuit substrate 14. Leads 15 extending from the lead terminals of the angular rate sensors 11x, 11y, 11z are connected to a conductive pattern on the circuit substrate 14. The circuit board 16 also supports various electronic components 16 making up drive and detection circuits, and is fixed to a baseboard 17 of aluminum by screws or adhesive. Therefore, the angular rate sensors 11x, 11y, 11z are supported by the damper block 13 and shielded from the exterior by the case 12 and the baseboard 17. The damper block 13 is effective to protect the angular rate sensors 11x, 11y, 11z from wobbling or being displaced due to accelerative motions imparted from the exterior, and also to suppress crosstalk interferences, i.e., driving vibration, between the angular rate sensors 11x, 11y, 11z. The angular rate sensors 11x, 11b, 11z are shielded from external noise by the case 12 and the baseboard 17.

Figure 9:
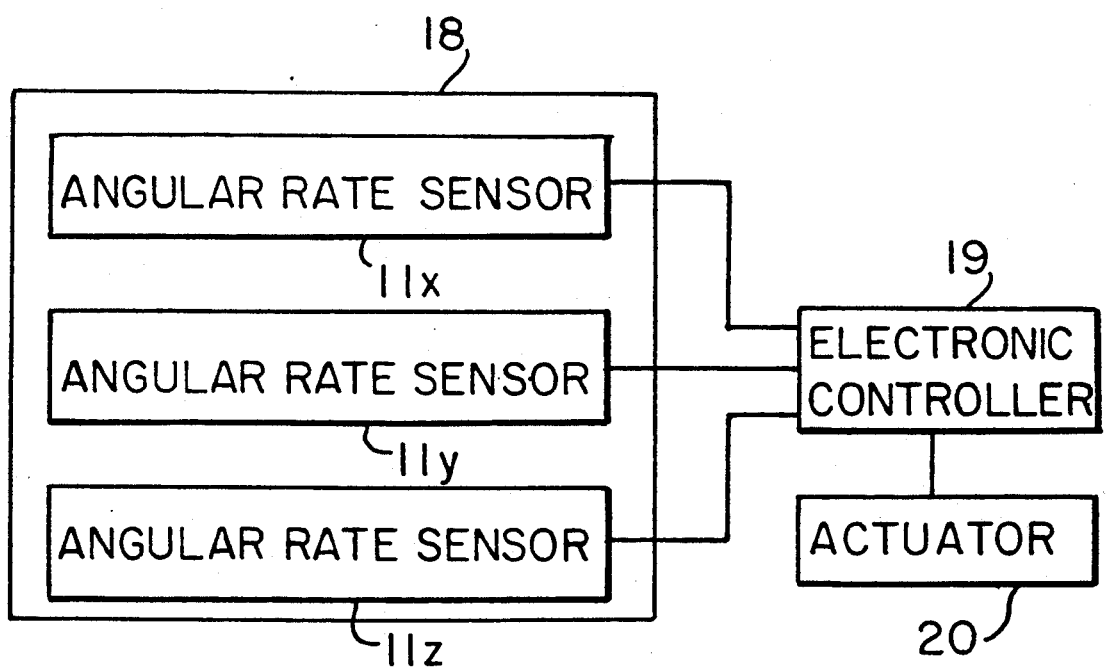
FIG. 9 is a block diagram of a vehicle suspension control system which employs the angular rate detecting device.

FIG. 9 shows in block form a vehicle suspension control system which employs the angular rate detecting device according to the present invention. The vehicle suspension control system comprises an angular rate detecting device 18 which includes the three tuning-fork vibratory-gyro angular rate sensors 11x, 11y, 11z shown in FIG. 7, an electronic controller 19 for effecting arithmetic operations on output signals from these angular rate sensors 11x, 11y, 11z, and a actuator 20 for varying the damping force of the shock absorber of a suspension.

Figure 10:
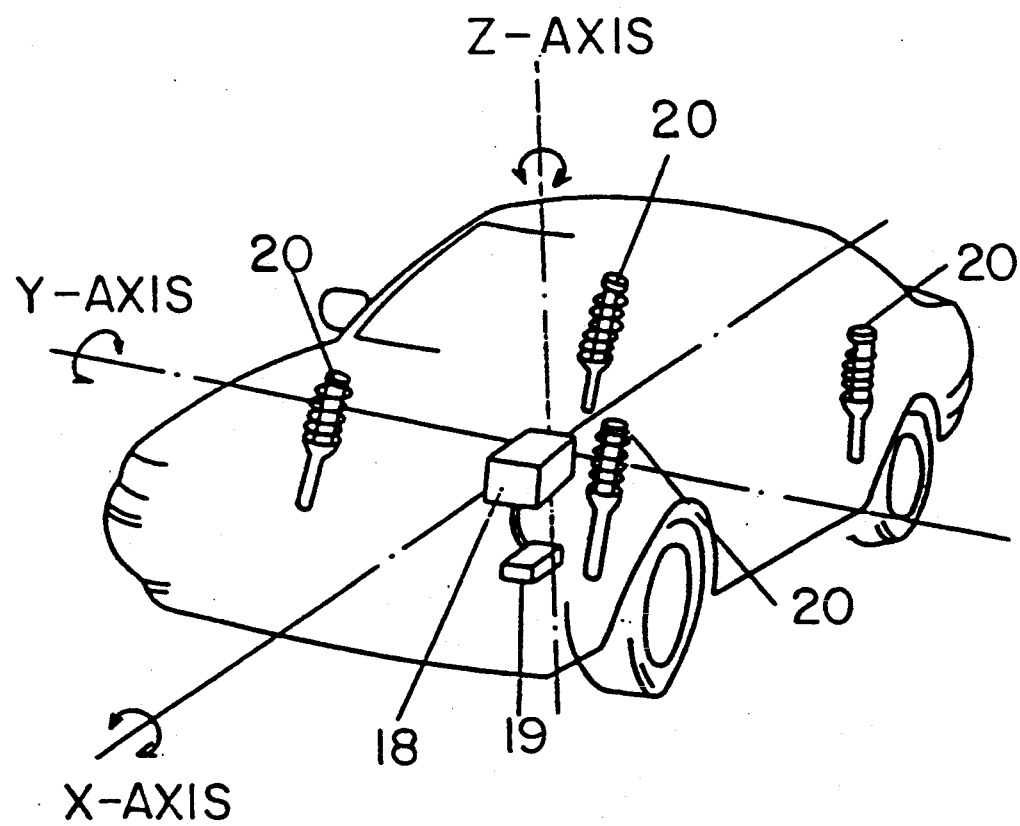
FIG. 10 is a perspective view of a motor vehicle with the angular rate detecting device installed therein.
Figure 11A:
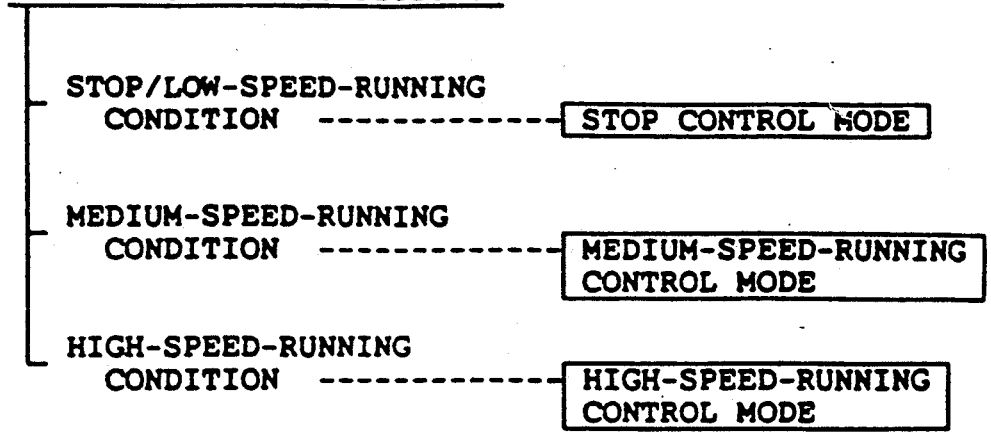
FIGS. 11(a) and 11(b) are diagrams showing various control modes of the suspension control system shown in FIG. 9.
Figure 11B:
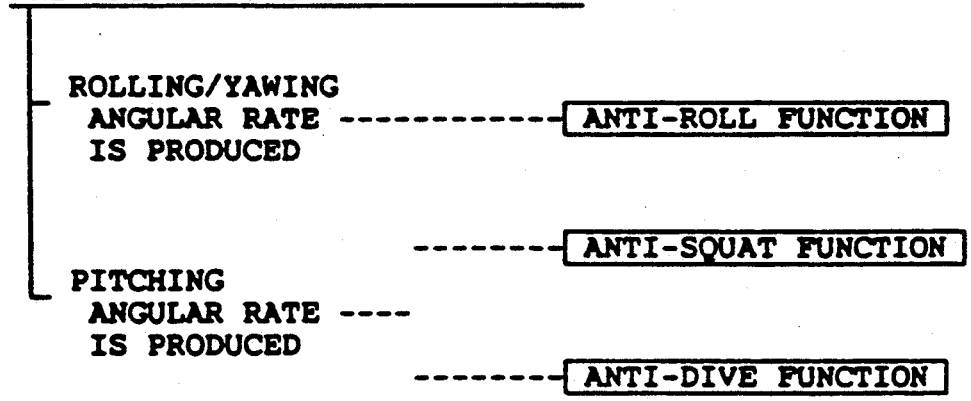

The angular rate detecting device 18, the electronic controller 19, and four actuators 20 are installed in a motor vehicle as shown in FIG. 10. The four actuators 20 are associated respectively with the suspensions of the four road wheels of the motor vehicle. The first angular rate sensor 11x is attached such that its detection axis is aligned with an X-axis along the direction in which the motor vehicle runs forwardly. The first angular rate sensor 11x serves to detect an angular vehicle displacement referred to as a roll. The second angular rate sensor 11y is attached such that its detection axis is aligned with a Y-axis along the horizontal transverse direction of the motor vehicle. The second angular rate sensor serves to detect an angular vehicle displacement referred to as a pitch. The third angular rate sensor 11z is attached such that its detection angle is aligned with a Z-axis along the vertical direction of the motor vehicle. The third angular rate sensor 11z serves to detect an angular vehicle displacement referred to as a yaw. The angular rate detecting device installed in the motor vehicle detects a three-dimensional attitude of the motor vehicle. The electronic controller 19 effects arithmetic operations on the detected signals from the angular rate sensors 11x, 11y, 11z, and produces control signals to minimize the vehicle displacements caused by disturbances and applies the control signals to the actuators 20 to vary the damping forces of the suspensions for improving the riding comfort and maneuvering stability of the motor vehicle.

Since the three angular rate sensors 11x, 11y, 11z have different vibration frequencies, they neither resonate nor apply noise to each other though they are encased in the single case 12. The angular rate detecting device is therefore capable of transmitting reliable signals to the electronic controller 19 for reliable control operation. As these angular rate sensors 11x, 11y, 11z are housed in the same case 12, the entire angular rate detecting device is compact in structure and small in size. Therefore, the angular rate detecting device does not take up a large space in the motor vehicle.

Specific control modes of operation of the suspension control system will be described with reference to FIGS. 11(a), 11(b) and 12(a) through 12(c). FIGS. 11(a), 11(b), and FIGS. 12(a) through 12(c) illustrate control modes while the motor vehicle is running and control modes against disturbances on the motor vehicle, these control modes being effected on the basis of signals from the angular rate sensors of the angular rate detecting device.

Normal running conditions of the motor vehicle are roughly grouped into three running conditions. In the first running condition, the motor vehicle is at rest or running at a low speed (in a speed range from 0 to about 5 Km/h). In the first running condition, the suspensions are controlled for a harder damping setting (stop control mode) in order to compensate for changes in the weight of the motor vehicle which are caused when passengers get on or off the motor vehicle or cargos are loaded on or unloaded off the motor vehicle, and also to compensate for disturbances acting on the motor vehicle immediately after the motor vehicle starts to move or immediately before or after the motor vehicle is stopped. In the second running condition, the motor vehicle runs at a medium speed (in a speed range from about 5 to 80 Km/h). In the second running condition, the suspensions are controlled for a softer damping setting (medium-speed-running control mode) in order to improve riding comfort unless the motor vehicle is subjected to appreciable disturbances. In the third running condition, the motor vehicle runs at a high speed of about 80 Km/h. In the third running condition, the suspensions are controlled for the harder damping setting (high-speed-running control mode) in order to improve stable maneuverability. When the motor vehicle stops and runs at a low speed or a high speed, the suspensions are unconditionally controlled for the harder damping setting so that the motor vehicle will not be displaced largely under the influence of applied disturbances.

As described above, the suspensions are controlled for the softer damping setting for improved riding comfort as long as the motor vehicle is running in the medium speed range (from about 5 to 80 Km/h). However, as soon as a disturbance is applied to the motor vehicle while it is running in this second running condition, the suspensions are switched out of the softer damping setting into the harder damping setting so that any disturbance-dependent displacement of the motor vehicle will be minimized. For example, when the motor vehicle makes a turn, the motor vehicle is caused to roll and yaw, as shown in FIG. 12(b), and angular rates are produced about the X- and Z-axes and sensed by the first and third angular rate sensors 11x, 11z, respectively. The detected signals are then sent from the angular rate sensors 11x, 11z to the electronic controller 19, which then applies control signals to the suspension actuators 20 for the harder damping setting to perform an anti-roll function. When the motor vehicle is quickly accelerated, the motor vehicle is subjected to a pitch as shown in FIG. 12(a). At this time, an angular rate is produced about the Y-axis and detected by the second angular rate sensor 11y. The detected signal is transmitted from the angular rate sensor 11y to the electronic controller 19, which then supplies a control signal to the actuators 20 for the harder damping setting to perform an anti-squat function. When the motor vehicle is braked, the motor vehicle is also subjected to a pitch as shown in FIG. 12(c). At this time, an angular rate is also produced about the Y-axis, and hence the electronic controller 19 controls the actuators 20 for the harder damping setting to perform an anti-dive function. After these disturbances are removed, the suspensions are switched back into the softer damping setting in the medium-speed-running control mode.

Although a certain preferred embodiment has been shown and described, it should be understood that many changes and modifications may be made therein without departing from the scope of the appended claims.

We claim as our invention:

1. An angular rate detecting device comprising:
   at least two angular rate sensors, each said rate sensor having a central axis therethrough and comprising:
   a first vibratory unit including a first piezoelectric drive element, a first piezoelectric detection element drivable by said first piezoelectric drive element, and joint means by which said first piezoelectric drive and detection elements are joined so that they are disposed in orthogonal planes, respectively, and
   a second vibratory unit including a second piezoelectric drive element, a second piezoelectric detection element drivable by said second piezoelectric drive element, and joint means by which said second piezoelectric drive and detection elements are joined so that they are disposed in orthogonal planes, respectively, said first and second vibratory units extending parallel to a detection axis, said first and second piezoelectric drive elements having ends interconnected in a tuning-fork structure;
   a case for housing said angular rate sensors therein, wherein each said angular rate sensor is disposed within said case such that each corresponding central axis of each said angular rate sensor is perpendicular to each other; and
   means for vibrating said first vibrating units of the angular rate sensors at different frequencies.

2. An angular rate detecting device according to claim 1, further comprising means for applying a first signal to said first piezoelectric drive elements to vibrate said first vibratory units for thereby vibrating said second vibratory units by way of tuning-fork vibration, and means for detecting a second signal representing electric charges generated by said second piezoelectric drive elements in response to the vibration of said second vibratory units, and means for controlling said first signal so that said second signal has a constant amplitude.

* * * * *